Patented May 29, 1951

2,554,810

UNITED STATES PATENT OFFICE 2,554,810

POLYMERIZATION OF DEHYDROGENATED ROSIN ACIDS AND DERIVATIVES

David S. Breslow, Wilmington, Del., assignor to Hercules Powder Company, Wilmington, Del., a corporation of Delaware No Drawing. Application December 31, 1947, Serial No. 795,126

22 Claims. (Cl. 260—99.5)

This invention relates to improved dehydrogenated rosinyl materials and to a method for their production. It relates more particularly to polymerized dehydrogenated rosinyl materials and to a method for their production.

Rosinyl materials having olefinic unsaturation are known to polymerize by the action of such catalysts as sulfuric acid, boron trifluoride, zinc chloride, and the like. The polymerization process improves the stability of these rosinyl materials in that the olefinic unsaturation is greatly reduced in that portion of the rosinyl material undergoing the polymerization. It has also been known to further stabilize polymerized rosinyl materials by a disproportionation or dehydrogenation process. The disproportionation or dehydrogenation process stabilizes that portion of the polymerized rosinyl material which is still in the monomeric state. Thus, dehydrogenation or disproportionation converts a polymerized rosin containing abietic acid and polymerized abietic acid into a stabilized composition containing polymerized abietic acid admixed either with dehydroabietic acid or with both dehydroabietic acid and dihydroabietic acid. The dehydrogenation or disproportionation reaction, as applied to polymerized rosin acids, or their esters, has not been known to produce a dehydrogenated polymerized abietic acid or its esters. Moreover, it has not heretofore been possible to produce a polymerized dehydrogenated rosinyl material by polymerization of a dehydrogenated rosinyl material.

Now in accordance with this invention, it has been found that dehydrogenated rosinyl materials may be polymerized by heating the dehydrogenated rosinyl material with substances known to decompose under the heating conditions to form free radicals and which may be called free-radical formers. Thus, it has been found that hydrocarbon free radicals created by decomposition of a free-radical former will react with dehydrogenated rosinyl materials to effect a polymerization of the dehydrogenated rosinyl material and the conversion of the free radical into a hydrocarbon molecule.

In producing a polymerized dehydrogenated rosinyl material, the dehydrogenated rosinyl material is mixed with the free-radical former and the mixture is heated to a temperature at which the hydrocarbon free radicals are formed by decomposition of the free-radical former. The resulting polymerized dehydrogenated rosinyl material is changed in properties to a degree dependent upon the amount of polymerization which has been effected. The polymerization process in general increases the boiling point and the melting point and the products thus find increased utility, especially where increased melting point and corresponding increase in hardness are of importance.

The invention described above in a general way may be better understood by reference to the following examples which illustrate the preparation of the improved polymerized dehydrogenated rosinyl materials of this invention. All parts and percentages given are by weight and the drop melting points given were determined by the Hercules drop melting point method well known in the art.

Example I

To 50 parts molten glycerol ester of dehydrogenated rosin (substantially free of esters of natural rosin acids) heated at 130° C. was gradually added 10 parts 20% solution of diacetyl peroxide in dimethyl phthalate with rapid dispersion of the solution. The mixture was heated for 10 minutes after the addition was complete and was then distilled in vacuo (2 mm. pressure; 250° pot temperature) to remove dimethyl phthalate. After a final nitrogen sparge at 300° C. for 15 minutes, a glycerol ester of increased melting point was obtained. A comparison of the original and the polymerized glycerol ester of dehydrogenated rosin is tabulated below:

|  | Acid Number | Drop Melting Point |
| --- | --- | --- |
|  |  | ° C. |
| Original Ester | 6.5 | 88 |
| Polymerized Ester | 3.3 | 103.5 |

Example II

To 50 parts molten mixed glycerol-glycol ester of dehydrogenated rosin (substantially free of esters of natural rosin acids) was added five parts tetraethyllead. The mixture was heated at 230° C. to 240° C. for 24 hours and was then cooled and dissolved in 100 parts benzene. The benzene solution was washed with 100 parts 5% nitric acid to destroy any unreacted tetraethyllead and was then washed with water until free of nitric acid. The polymerized dehydrogenated rosin ester was recovered by distilling off the benzene in vacuo up to a temperature of 175° C. A comparison of the original ester and the resulting product is tabulated below:

Drop melting point
Original ester _____ 75° C.
Polymerized ester _____ 81° C.

Example III

To 60 parts molten dehydrogenated rosin (substantially free of natural rosin acids), drop melting point 75° C. and acid number 162, heated at about 125° C. was added gradually over a 30-minute period 79 parts of a 30% solution of diacetyl peroxide in dimethyl phthalate with rapid dispersion of the solution. After heating about 30 minutes longer the solution was steam distilled to remove dimethyl phthalate and low boiling materials and the non-volatile material was cautiously neutralized with 600 parts 2% sodium hydroxide solution. Neutral materials were extracted from the resulting sodium salt solution by ether extraction. The salt was then acidified with sufficient 10% sulfuric acid solution to liberate all of the organic acid. The resinous acid which separated was washed with hot water and dried in vacuo. This resinous acid amounted to 56.4 parts. It had an acid number 155 to 156.5 and a drop melting point 120° C. Its molecular weight (determined by boiling point elevation in acetone) was 400–414.

Example IV

To 314 parts methyl dehydroabietate heated at 125–130° C. was added dropwise over a four-hour period with rapid dispersion of the drops 129 parts of a 22.8% solution of diacetyl peroxide in dimethyl phthalate. The reaction mixture was heated for an hour longer after all of the diacetyl peroxide had been added. The reaction mixture was then subjected to distillation in vacuo. Dimethyl phthalate was removed at 113–130° C. (2 mm. pressure) and 270 parts methyl dehydroabietate was removed at 175–195° C. (1 mm. pressure) leaving 44 parts residue which was cooled to a hard red glass having a molecular weight of 528 (boiling point elevation method using acetone solvent). This residue was a polymerized methyl dehydroabietate.

Example V

Example IV was repeated using 15.7 parts pure methyl dehydroabietate, capillary melting point 62–62.5° C., and 52 parts of a 22.8% solution of diacetyl peroxide in dimethyl phthalate. The high boiling residue obtained after removal of dimethyl phthalate by distillation in vacuo was an amber glass amounting to 15.5 parts and having a molecular weight of 470 (boiling point elevation method using acetone).

Example VI

Example IV was repeated using 50 parts methyl dehydroabietate and 36.2 parts of a 14.7% solution of diacetyl peroxide in dimethyl phthalate. The polymerized methyl dehydroabietate obtained as a residue after distilling off the dimethyl phthalate and excess methyl dehydroabietate in vacuo amounted to 8.5 parts. Five parts of this residue was saponified by heating with potassium hydroxide in diethylene glycol at about 200–210° C. for 2 hours. The resulting salt solution was diluted with water, acidified with dilute sulfuric acid, and the precipitated acidic resin recovered. This resin was taken up in ether, washed with water, and dried over anhydrous sodium sulfate. The ether was then distilled off to recover 4.4 parts polymerized dehydroabietic acid as a resin having a drop melting point 144° C. This resin on crystallization from methanol yielded a white crystalline dibasic acid having a melting point of about 320° C. (uncorrected) and showing a molecular weight of about 540 by the Rast Camphor Method.

Example VII

A mixture of 314 parts methyl dehydroabietate and 32.3 parts tetraethyllead was heated at 200° C. for 40 hours, at the end of which time, reaction as indicated by gas evolution had ceased. The reaction mixture was cooled, taken up in ether, and treated with 2 parts bromine in 10 parts carbon tetrachloride to destroy any unreacted tetraethyllead which remained. The ether solution was then shaken with diatomaceous earth and filtered to remove metallic lead. The ether was distilled off from the filtrate and excess methyl dehydroabietate was then distilled off in vacuo. There remained as residue from the distillation a dark glassy polymerized methyl dehydroabietate amounting to about 83 parts. The residue was further purified by dissolving in acetone and filtering off a small amount of black precipitate. The polymerized methyl dehydroabietate purified in this manner and again isolated as a resin had a saponification number of 171 and a molecular weight (boiling point elevation in acetone) of 670.

The dibasic acid obtained by saponifying the polymerized methyl dehydroabietate with potassium hydroxide at 200° C. in diethylene glycol solution and subsequently acidifying was a resin having an acid number of 162 and molecular weight (boiling point elevation in acetone) 700.

Example VIII

To 854 parts methyl dehydroabietate at 250° C. was added 88 parts tetraethyllead dropwise with stirring in a nitrogen atmosphere. The addition took one hour. Heating was continued for two more hours and the product was then subjected to distillation in vacuo to remove unreacted methyl dehydroabietate amounting to 642 parts. The high boiling polymerized methyl dehydroabietate left as a residue from the distillation was dissolved in 500 parts diethylene glycol and heated to 220° C. with 56 parts potassium hydroxide added in solution in 35 parts water. The water was driven off in heating to 220° C. and the heating was then continued at 220° C. for an hour. The resulting salt solution was poured into a liter of water, treated with active charcoal, and filtered. The filtrate was acidified with 10% sulfuric acid to precipitate the crude polymerized dehydroabietic acid. The precipitate was separated by dispersing in diisopropyl ether into an insoluble fraction amounting to 33 parts, acid number 129, drop melting point greater than 250° C. and a soluble fraction which after removal of the diisopropyl ether amounted to 171 parts. This latter fraction of polymerized dehydroabietic acid had the following analysis: acid number 170, drop melting point 155.5° C., and molecular weight (boiling point elevation method in acetone) 583.

Example IX

Dehydrogenated rosin oil was polymerized in the same manner as that applied to methyl dehydroabietate as in Example V. The polymerized dehydrogenated rosin oil was a resin similar in appearance to rosin.

Example X

To 50 parts pentaerythritol ester of dehydrogenated rosin, drop melting point 105° C., melted at 120° C., was added with rapid stirring 25 parts tert-butyl hydroperoxide (60% tert-butyl hydroperoxide). The addition was completed in 10 minutes and the temperature was then raised to 180° C. over a one-hour period. The product was then sparged with a stream of carbon dioxide in vacuo while heating at 250° C. The resulting polymerized ester had a drop melting point of 128° C. The yield was substantially quantitative.

*Example XI*

Example X was repeated using 70% cumene hydroperoxide in place of the tert-butyl hydroperoxide. The resulting polymerized ester was obtained in substantially quantitative yield, and it had a drop melting point of 130° C.

*Example XII*

Example X was repeated using in place of tert-butyl hydroperoxide powdered dibenzoyl peroxide (90% purity) which was added by sprinkling into the molten ester with rapid stirring. The polymerized ester obtained in substantially quantitative yield had a drop melting point of 129° C.

The above examples show methods of producing polymerized dehydroabietic acid both by polymerization of dehydroabietic acid and by saponification of a polymerized dehydroabietic acid ester. They also show methods of polymerizing dehydroabietic acid esters and dehydrogenated rosin oil. The polymerization procedure is also applicable to other dehydrogenated rosinyl materials such as dehydroabietyl alcohol and its esters, salts of dehydrogenated rosin and nitriles of dehydrogenated rosin. In the case of dehydroabietyl alcohol polymerized with oxidizing free radical formers, the product is a mixture containing dehydroabietyl alcohol and dehydroabietic aldehyde and esters in their polymeric forms. This mixture is suitable for conversion to resins.

In the case of esters of dehydroabietyl alcohol, those esters of acids having a hydrogen on the alpha carbon atom of the acid undergo also a dimerization reaction at the alpha carbon atom of the acid. For instance, dehydroabietyl acetate will dimerize in such a manner that the product contains esters of succinic acid admixed with the acetate. Dimerization also takes place in the dehydroabietyl part of the molecule so that a complex mixture results. Simple dimerization between the dehydroabietyl portion of the molecule takes place in the case of those aliphatic acids having no hydrogen on the alpha carbon. Complex polymerization between both the acid group and the dehydroabietyl group again takes place with esters of alkyl-substituted aromatic acids. Dehydroabietyl cumate, for example, undergoes dimerization both at the isopropyl group of the cumic acid radical and in the dehydroabietyl nucleus. It is preferred for the production of polymers in accordance with this invention from esters of dehydroabietyl alcohol to use those esters which form simple polymers. The simple polymers are formed by those aliphatic esters of the type in which the alpha carbon atom is completely substituted and those aromatic esters in which any alkyl substituents are completely substituted at the carbon of the alkyl group which is alpha to the aromatic nucleus. In the case of salts, fusible metal salts of dehydrogenated rosin acids can be made higher melting with the incorporation of less metal by the polymerization process of this invention. Lead resinates of polymerized dehydroabietic acid are also formed in part when dehydroabietic acid is fused with tetraethyllead.

Polymerized dehydrogenated rosinyl materials of this invention may also be formed by well known reactions from the polymerized dehydrogenated rosinyl materials whose preparation has been shown above. Thus, from polymerized dehydroabietic acid there can be made both acidic and neutral esters of monohydric alcohols and of polyhydric alcohols by well known esterification methods. Nitriles and acid nitriles of polymerized dehydrogenated rosin acids can be made by heating a polymerized dehydrogenated rosin acid with ammonia in the manner well known in the art for converting rosin to rosin nitriles. The nitriles can be further converted by partial hydrolysis to amides and acid amides of polymerized dehydrogenated rosin acids or by hydrogenation to a polmerized dehydrogenated rosin amine (such as polymerized dehydroabietyl amine) and the corresponding acid amine. The polymerized dehydrogenated rosin acid can be converted by reaction with metal salts, metal hydroxides, and metal oxides to the corresponding salts of polymerized dehydrogenated rosin acid. Polymerized dehydrogenated rosin acid may also be decarboxylated to form a monobasic acid of molecular weight about twice that of the dehydrogenated rosin acid or it may be completely decarboxylated to polymerized dehydrogenated rosin oil equivalent to the polymerized dehydrogenated rosin oil obtained by polymerization of dehydrogenated rosin oil in accordance with the process of Example IX. Polymerized dehydrogenated rosin acid esters, especially the monohydric alcohol esters, are converted into primary alcohols by well-known processes of hydrogenation with copper chromite catalysts and the like, or by sodium and alcohol reduction. The product of partial reduction will contain one primary alcohol group and one carboxylic acid or ester group and the product will be amenable to resin formation by intermolecular condensation. All of the products derived from polymerized dehydrogenated rosin acids are polymerized dehydrogenated rosinyl materials whether made from other polymerized dehydrogenated rosinyl materials or made by polymerization of the corresponding dehydrogenated rosinyl material.

The monohydric alcohols from which esters of this invention may be made include methyl alcohol, ethyl alcohol, propyl alcohols, butyl alcohols, and higher alcohols. The polyhydric alcohols which may be esterified with polymerized dehydrogenated rosin acids or whose dehydrogenated rosin acid esters may be polymerized include ethylene glycol, trimethylene glycol, propylene glycol, glycerin, trimethylol ethane, pentaerythritol, 2,2-dimethyl trimethylene glycol and the like.

In the case of polymerized dehydrogenated rosin acid esters, these esters may be made either by polymerization of the dehydrogenated rosin acid ester or by esterification of the polymerized dehydrogenated rosin acid. The products are equivalent when esters of monohydric alcohols are concerned but not when esters of polyhydric alcohols are concerned. The products are believed to have different properties especially with regard to ease of gellation. Thus, in the polymerization of dehydrogenated rosin esters of polyhydric alcohols, gelled esters are not as readily formed as they are in the esterification of polymerized dehydrogenated rosin acids with polyhydric alcohols.

In order to distinguish the two types of esters, it is intended that the phrase "ester of a polymerized dehydrogenated rosin acid" refer to the ester formed by esterification of a polymerized dehydrogenated rosin acid with an alcohol and the phrase "polymerized ester of a dehydrogenated rosin acid" refer to the ester formed by polymerization of an ester of a dehydrogenated rosin acid. It is further intended that the phrase "polymerized dehydrogenated rosin acid ester" be generic to these two terms so defined.

The most effective free radicals for polymerization of the type used in this invention are the lower hydrocarbon free radicals having six or less carbon atoms. The free radical formers which produce these free radicals and may be used in the process of this invention include organic peroxides such as diacetyl peroxide, dipropionyl peroxide, dibenzoyl peroxide and other diacyl peroxides, di (tert-butyl) peroxide, diethyl peroxide, methyl ethyl peroxide and other organic dialkyl peroxides, dibutyl ether peroxide, ethyl butyl ether peroxide, diisopropyl ether peroxide and other dialkyl ether peroxides, ethyl hydroperoxide, tert-butyl hydroperoxide, cumene hydroperoxide, and other alkyl hydroperoxides; and aliphatic organometallic compounds which decompose into free radicals under the action of heat, light, or an electric discharge. The most suitable organometallic compounds are those which are decomposed at temperatures below about 350° C. either by heat alone, by light or by electric discharge. The preferred organometallic compounds are the methyl and ethyl organometallic derivatives of lead, zinc, and mercury. The preferred organic peroxides are those having less than about 15 carbon atoms per molecule. Of these, the diacyl peroxides and the alkyl hydroperoxides are preferred. The preferred alkyl hydroperoxides are the tert-alkyl hydroperoxides such as cumene hydroperoxide and tert-butyl hydroperoxide. While any of the dehydrogenated rosinyl materials may be polymerized with any of these free-radical formers, consideration must be given to possible side reactions in choosing the proper free-radical former. Dehydrogenated rosin, for example, reacts with tetraethyllead to form a salt and the effectiveness of the tetraethyllead is reduced thereby and lead will remain in the product. In the case of polymerization of metal salts of dehydrogenated rosin, this reaction does not cause the same difficulties and the lead may be left in the product, if desired. On the other hand, diacyl peroxides are satisfactory free-radical formers for use in polymerization of dehydrogenated rosin but are less satisfactory for polymerization of the salts because of the high temperatures usually required for liquefying the salts.

The amount of free-radical former required for the polymerization will be dependent upon the amount of polymer it is desired to form. Two free radicals are required for formation of one polymer molecule. If, as some authorities believe, one mole diacyl peroxide yields one mole of hydrocarbon free radical, one mole diacyl peroxide will be required for complete polymerization of one mole dehydrogenated rosinyl material. Side reactions in the decomposition will reduce the yield to some extent and more than this amount of diacyl peroxide may actually be required. Since one mole tetraalkyllead yields four moles alkyl free radicals, only one-fourth of a mole tetraalkyllead is required for polymerization of one mole of dehydrogenated rosinyl material. Thus, the amount of free-radical former can readily be calculated. If it is desired to raise the melting point of a dehydrogenated rosinyl material by polymerization with free radicals, this can be effected by polymerization of only a small part of the dehydrogenated rosinyl material and thus much less free-radical former than that required for complete polymerization will be used. The exact amount of free-radical former is readily determined by a preliminary test.

The temperature of reaction may be any temperature above about 50° C. and below that at which the product tends to decompose. Thus, temperatures above about 350° C. are generally not used. The preferred temperature range for the reaction using organic peroxides is from about 50° C. to about 150° C. and the preferred temperature range for the reaction when using organometallic compounds is from about 200° C. to about 250° C. The organic lead compounds in general do not form free radicals below about 150° C. without activation.

The free-radical formers are added in such a manner that they are dispersed as rapidly as possible to prevent the free radicals into which they break down from uniting with each other rather than reacting with the dehydrogenated rosinyl material. Excess free-radical former and products of decomposition thereof may be removed if desired in various ways. Excess organic peroxide and by-products formed in its decomposition may be removed by steam sparging and by water washing or by steam sparging alone. Excess metallo-organic compound may be decomposed by washing with small amounts of oxidizing agents such as bromine water or dilute nitric acid. If the free metal is to be removed, this may be done by filtration of a solution of the product through an activated clay, active carbon, and the like.

While the diacetyl peroxide of the examples has been used in a dimethyl phthalate solution, such a solvent is not necessary and is used only because of the availability of such a solution. The organic peroxide is preferably added to the rosinyl material without a solvent. This may be done by spraying the rosinyl material and peroxide together or by adding excess organic peroxide to the rosinyl material which can then be added to more rosinyl material. Other methods of combining will be obvious to those skilled in the art and will vary according to the physical properties of the rosinyl material under consideration. If solvents are used, suitable solvents include benzene, straight chain hydrocarbons, and esters of tertiary acids such as methyl benzoate, methyl trimethylacetate, and the like.

The product of the polymerization of dehydrogenated rosinyl materials of this invention is chiefly dimeric; i. e., two dehydrogenated rosinyl materials are united by a carbon to carbon linkage. However, trimeric products are also produced to a degree dependent largely on whether an excess of free-radical former is used. The dimeric dehydrogenated rosinyl material is believed to be a product which would result by removal of a hydrogen from the dehydrogenated rosinyl material to form a radical which radical then combines with another similar radical formed in the same way to create a product of substantially twice the molecular weight of the original dehydrogenated rosinyl material. Such a product is a dimer and is free of olefinic unsaturation but has benzenoid unsaturation only. Analytically, the polymerized dehydrogenated rosinyl materials can thus be readily distinguished from well-known polymerized rosinyl materials since the latter have olefinic unsaturation and no benzenoid unsaturation. The presence of benzenoid unsaturation is easily and semiquantitatively determined by means of ultraviolet absorption spectra.

The term "dehydrogenated rosinyl material" is intended to cover materials containing an octahydro phenanthrene nucleus in which one of the rings of the nucleus is benzenoid as in dehydroabietic acid. Rosinyl materials are materials derived from rosin and which have the $C_{19}H_{29}$ or $C_{19}H_{31}$ nucleus in their structure, said nucleus having a decahydro- or dodecahydro-phenanthrene nucleus in which none of the rings are benzenoid. The term "dehydrogenated rosin acid" is intended to include those acidic dehydrogenated rosinyl materials formed in the dehydrogenation of natural rosin acids or rosin of which dehydroabietic acid is an example.

In this application the term "dehydrogenated rosin" is meant to refer to a rosin containing a substantial portion of dehydroabietic acid and includes the product of the disproportionation of wood or gum rosin. The dehydrogenated or disproportionated rosin may be produced by contacting rosin or rosin acids at an elevated temperature with a catalyst such as an active hydrogenation catalyst in the absence of added hydrogen. Catalysts such as palladium, platinum, nickel, copper, chromite, etc., are suitable. The catalysts may be supported on a carrier such as granular alumina, fibrous asbestos or activated charcoal if desired. Dehydrogenation or disproportionation with a palladium catalyst, for example, may be conducted either by a batchwise or continuous procedure. Thus, rosin may be agitated with about 5% to about 20% by weight of a palladium catalyst supported on activated carbon (1% to 2% palladium) at about 150° C. to about 300° C. for about 1 to about 5 hours. In the continuous process, the molten rosin flows over the supported palladium catalyst at a temperature within the range of about 225° C. to about 300° C. to provide a contact time of about ¼ hour to about 1 hour. Rosin esters, rosin nitriles, rosin oils, and other rosin materials may similarly be dehydrogenated or disproportionated to produce the corresponding dehydrogenated rosinyl material which may be polymerized by the process of this invention.

It is readily seen from the foregoing description of this invention that there is here provided a method by which may be made as new compositions of matter a large number of polymerized dehydrogenated rosinyl materials among which may be mentioned polymerized dehydrogenated rosin acids, polymerized dehydrogenated rosin oil, polymerized dehydrogenated rosin acid salts, polymerized dehydrogenated rosin esters of monohydric alcohols, polymerized dehydrogenated rosin esters of polyhydric alcohols which include the polymerized ester of a dehydrogenated rosin acid and the polyhydric alcohol and the polyhydric alcohol ester of a polymerized dehydrogenated rosin acid, polymerized dehydrogenated rosinyl alcohol, esters of polymerized dehydrogenated rosinyl alcohol, nitriles of polymerized dehydrogenated rosin acids, amides of polymerized dehydrogenated rosin acids, and polymerized dehydrogenated rosin amines.

The polymerized dehydrogenated rosinyl materials of this invention are useful as ingredients of protective and decorative coatings and as intermediates in the preparation of new chemical products.

What I claim and desire to protect by Letters Patent is:

1. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, dehydrogenated rosin nitriles, and dehydrogenated rosin oil which comprises heating said material with a substance which decomposes into hydrocarbon free radicals when heated at a temperature above about 50° C. and below that at which said material tends to decompose, said free-radical former being selected from the group consisting of organic peroxides, organic hydroperoxides, and organometallic compounds.

2. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, dehydrogenated rosin nitriles, and dehydrogenated rosin oil which comprises heating said material with an organic peroxide at a temperature within the range of about 50° C. and about 350° C.

3. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, dehydrogenated rosin nitriles, and dehydrogenated rosin oil which comprises heating said material with a diacyl peroxide at a temperature within the range of about 50° C. and about 350° C.

4. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, dehydrogenated rosin nitriles, and dehydrogenated rosin oil which comprises heating said material with diacetyl peroxide at a temperature within the range of about 50° C. and about 350° C.

5. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, dehydrogenated rosin nitriles, and dehydrogenated rosin oil which comprises heating said material with diacetyl peroxide at a temperature within the range of about 50° C. and about 150° C.

6. The method of polymerizing esters of dehydrogenated rosin acids which comprises heating said esters of dehydrogenated rosin acids with diacetyl peroxide at a temperature within the range of about 50° C. and about 150° C.

7. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, and dehydrogenated rosin oil which comprises heating said material with an alkyl hydroperoxide at a temperature within the range of about 50° C. and about 350° C.

8. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, and dehydrogenated rosin oil which comprises heating said material with a tert.-alkyl hydroperoxide at a temperature within the range of about 50° C. and about 350° C.

9. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, and dehydrogenated rosin oil which comprises heating said material with cumene hydroperoxide at a temperature within the range of about 50° C. and about 350° C.

10. The method of polymerizing esters of dehydrogenated rosin acids which comprises heating said esters of dehydrogenated rosin acids with cumene hydroperoxide at a temperature within the range of about 50° C. and about 350° C.

11. The method of polymerizing esters of dehydrogenated rosin acids which comprises heating said esters with cumene hydroperoxide at a temperature within the range of about 50° C. and about 150° C.

12. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, and dehydrogenated rosin oil which comprises heating said material with an organometallic compound which decomposes into aliphatic free radicals when heated at a temperature above about 50° C. and below that at which said material tends to decompose.

13. The method of polymerizing a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, and dehydrogenated rosin oil which comprises heating said material with tetraethyllead at a temperature within the range of about 200° C. and about 250° C.

14. A polymerized dehydrogenated rosinyl material produced by heating a dehydrogenated rosinyl material selected from the group consisting of dehydrogenated rosin acids, salts of dehydrogenated rosin acids, esters of dehydrogenated rosin acids, dehydrogenated rosin alcohols, esters of dehydrogenated rosin alcohols, dehydrogenated rosin nitriles, and dehydrogenated rosin oil with a substance which decomposes into hydrocarbon free radicals when heated at a temperature above about 50° C. and below that at which said material tends to decompose, said free-radical former being selected from the group consisting of organic peroxides, organic hydroperoxides, and organometallic compounds.

15. A polymerized dehydrogenated rosin acid produced by heating a dehydrogenated rosin acid with a substance which decomposes into hydrocarbon free radicals when heated at a temperature above about 50° C. and below that at which said rosin acid tends to decompose, said free-radical former being selected from the group consisting of organic peroxides, organic hydroperoxides, and organometallic compounds.

16. A polymerized dehydrogenated rosin oil produced by heating a dehydrogenated rosin oil with a substance which decomposes into hydrocarbon free radicals when heated at a temperature above about 50° C. and below that at which said rosin oil tends to decompose, said free-radical former being selected from the group consisting of organic peroxides, organic hydroperoxides, and organometallic compounds.

17. A polymerized dehydrogenated rosin acid ester produced by heating an ester of a dehydrogenated rosin acid with a substance which decomposes into hydrocarbon free radicals when heated at a temperature above about 50° C. and below that at which said material tends to decompose, said free-radical former being selected from the group consisting of organic peroxides, organic hydroperoxides, and organometallic compounds.

18. A polymerized dehydrogenated rosin acid ester of a polyhydric alcohol produced by heating a dehydrogenated rosin acid ester of said polyhydric alcohol with an organic peroxide at a temperature within the range of about 50° C. and about 350° C.

19. A polymerized dehydrogenated rosin acid ester of glycerol produced by heating the glycerol ester of a dehydrogenated rosin acid with an organic peroxide at a temperature within the range of about 50° C. and about 150° C.

20. A polymerized dehydrogenated rosin acid ester of pentaerythritol produced by heating the pentaerythritol ester of a dehydrogenated rosin acid with an organic peroxide at a temperature within the range of about 50° C. and about 150° C.

21. A polymerized dehydrogenated rosin acid ester of a monohydric alcohol produced by heating a dehydrogenated rosin acid ester of said monohydric alcohol with an organic peroxide at a temperature within the range of about 50° C. and about 350° C.

22. A polymerized methyl dehydroabietate produced by heating methyl dehydroabietate with an organic peroxide at a temperature within the range of about 50° C. and about 150° C.

DAVID S. BRESLOW.

REFERENCES CITED

The following references are of record in the file of this patent:

UNITED STATES PATENTS

| Number | Name | Date |
| --- | --- | --- |
| 2,108,928 | Rummelsburg | Feb. 22, 1938 |
| 2,154,629 | Littmann | Apr. 18, 1939 |
| 2,407,248 | Borglin | Sept. 10, 1946 |

OTHER REFERENCES

Fieser et al.: J. Am. Chem. Soc., vol. 60, 1938, p. 2631.

Berkman et al.: Catalysis, Reinhold Publishing Co., 1940, p. 960.